US005687341A

United States Patent [19]

Ducateau

[11] Patent Number: 5,687,341
[45] Date of Patent: Nov. 11, 1997

[54] DEVICE FOR SPEEDING UP THE READING OF A MEMORY BY A PROCESSOR

[75] Inventor: Michel Ducateau, Nogent le Roi, France

[73] Assignee: Sextant Avionique, Meudon La Foret Cedex, France

[21] Appl. No.: 450,535

[22] Filed: May 25, 1995

[30] Foreign Application Priority Data

May 27, 1994 [FR] France ................... 94 06580

[51] Int. Cl.$^6$ .................................. G06F 13/00
[52] U.S. Cl. .............. 395/405; 395/484; 395/421.09; 365/230.02
[58] Field of Search ............... 395/429, 484, 395/496, 405, 421.09; 365/230.02

[56] References Cited

U.S. PATENT DOCUMENTS 3,771,145  11/1973  Wiener .......................... 365/240
4,394,642  7/1983  Currie et al. ..................... 341/81

FOREIGN PATENT DOCUMENTS 2272088  4/1994  United Kingdom .
8905488  6/1989  WIPO .

*Primary Examiner*—David L. Robertson
*Attorney, Agent, or Firm*—Browdy and Neimark

[57] ABSTRACT

The device embodying the invention uses at least two read-only memory blocks containing the instructions of the application code and of which the addressing inputs are respectively connected to two counters connected to the address bus of the microprocessor. The read outputs of these blocks are connected to the data bus of the microprocessor via two buffers. A control circuit is provided to control, as a function of the nature of the addresses transmitted on the address bus and at the rhythm of the latter, a succession of cycles each comprising the transfer on the data bus, via one or other of the buffers, of the data contained in one or other of the memories and the incrementing of the counter associated with the other memory, in order to anticipate the data transfer of the next cycle. The invention applies notably to the processors taken on board aerodynes.

6 Claims, 2 Drawing Sheets

DEVICE FOR SPEEDING UP THE READING OF A MEMORY BY A PROCESSOR

BACKGROUND OF THE INVENTION

1—Field of the Invention

This invention relates to a device for optimizing the performance characteristics of a processor with the use of slow-access read-only memories for the application program associated with a processor.

2—Description of the Prior Art

It is known that with new processors, e.g. of the 88100, SPARC 601, DSP 320CXX, etc. types, full performance is obtained when the memory, and more particularly the instruction memory, is capable of supplying one instruction per clock cycle. When this is not the case, the maximum performance of the processor is divided by the number of cycles required to access an instruction (i.e., for instance, a power divided by two if the memory response takes two cycles).

Thus, for a processor operating at a frequency of 25 MHz (i.e. with cycles of 40 ns) to achieve full performance, instruction memories capable of supplying instructions within a time range of 20 to 25 ns must be used. For a processor operating at 33 MHz, this time is as low as 15 ns.

In practice, these access times are available in RAM technology, thus implying, for the application code (programme), that the instructions be copied from a read-only memory space to a RAM space when the processor is powered up.

However, this solution is not suited to numerous applications:

In the case of an on-board processor, e.g. on board an aerodyne, it is particularly dissuasive to need a multiplicity of memory cases (always costly) in which the application code is copied. Moreover, it cannot be guaranteed that the contents of the RAM will be saved in the event of a power cut-off lasting more than a predetermined period of time.

Furthermore, for critical applications such as, e.g. flight controls using application programs in excess of 100 kilobytes, the copying of the program into the RAM necessarily entails an unacceptable interruption of service.

Moreover, in a device of this type, the insertion of a correcting code in each instruction stored in the memory is not satisfying since the logic checking this control bit increases memory access time and does not enable sufficient corrections to be guaranteed. It is psychologically difficult to accept that function instructions might be stored in RAM protected by cell or battery.

OBJECT OF THE INVENTION

The main object of this invention is therefore more particularly to remedy the preceding disadvantages.

SUMMARY OF THE INVENTION

Accordingly, there is provided a device capable of supplying, on the data bus of a processor, one instruction per cycle coming from read-only memories used as execution memory, without requiring that the processor use a specific signal other than the addresses it issues on its address bus and the control signals it generates during memory access.

According to the invention, in this device, the application program instructions are contained in at least two read-only memory blocks of which the addressing inputs are respectively connected to two counters connected to the address bus and of which the read outputs are connected to the data bus via two buffers. A logic circuit is then provided in order to control, as a function of the type of addresses transmitted on the address bus and at the transmission rate of the addresses, a succession of cycles each comprising the transfer, on the data bus via one or other of the buffers, of the data generated by one or other of the memory blocks and the incrementation of the counter associated with the other memory block, so as to anticipate the transfer of data which will be performed during the next cycle.

Advantageously, the above-mentioned logic circuit can comprise two logic comparators intended to compare the outputs of the counters with the address provided by the processor, so as to authorize, at the end of the cycle, the transfer of the data contained in the buffer memory, and which correspond theoretically to said address, only in the event of the comparison revealing an identity, and so as to prohibit said transfer in the event of said comparison revealing a discrepancy.

BRIEF DESCRIPTION OF THE DRAWINGS

Further features and advantages of the invention will be apparent from the embodiment of the invention described, by way of a non-limiting example, in reference to the corresponding accompanying drawings in which.

DESCRIPTION OF THE PREFERRED EMBODIMENTS

In this example, the device comprises two read-only memory blocks $ROM_I$, $ROM_P$ of which the address inputs are respectively connected to the address bus 1 of the microprocessor µP via two respective counters $Counter_P$, $Counter_I$, and of which the read outputs are connected to the data bus 2 of the microprocessor µP via two respective buffers $Buffer_P$, $Buffer_I$.

The counters $Counter_P$ and $Counter_I$ are intended to respectively receive the even and odd addresses generated on the bus 1, except for the least significant address bit which is loaded in a register 3 of which the output Q is connected to a logic circuit 4 which controls the incrementing of the counters $Counter_P$ and $Counter_I$ and the opening of one or other of the buffers $Buffer_P$ and $Buffer_I$ in order to transmit the data from the memory blocks MP or MI onto the data bus of the microprocessor µP.

These counters $Counter_P$ and $Counter_I$ are designed so as to issue the respective addresses of the memory blocks $ROM_P$ and $ROM_I$ with which they are associated, except for the least significant bit of the address coming from the microprocessor µP (which is not received by the memory blocks $ROM_P$ and $ROM_I$).

The buffers $Buffer_P$, $Buffer_I$ receive at their inputs the data contained by the respective memory blocks $ROM_P$, $ROM_I$ at the addresses indicated by the counters $Counter_P$, $Counter_I$.

The register 3 operates like a bistable flip-flop during each cycle. The output Q of this register R is used by the logic circuit 4 in order to determine which buffer $Buffer_P$ or $Buffer_I$ will provide the datum from the memory block $ROM_P$ or $ROM_I$ to the microprocessor µP for sampling on the current cycle.

Thus, if the output Q of the register is in the "0" state, the cycle is an even address cycle and the buffer register Buffer$_P$ is authorized to transmit the data it contains. If the output Q is in the logic "1" state, the buffer Buffer$_I$ that is open for the memory block ROM$_I$ to transmit its contents onto the data bus 2.

Figure 1:
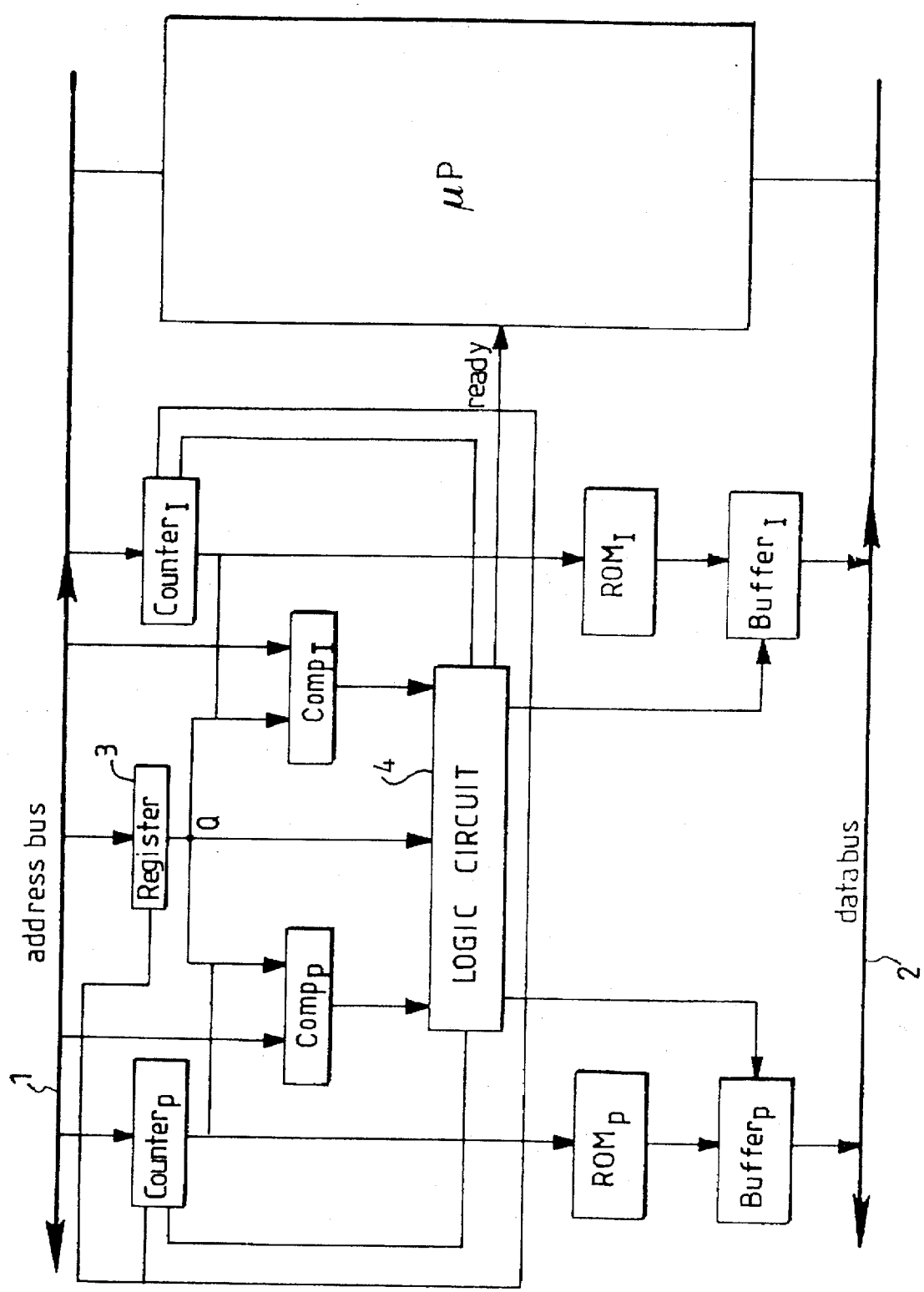
FIG. 1 is a synoptic diagram of a device embodying the invention.
Figures 2, 3:
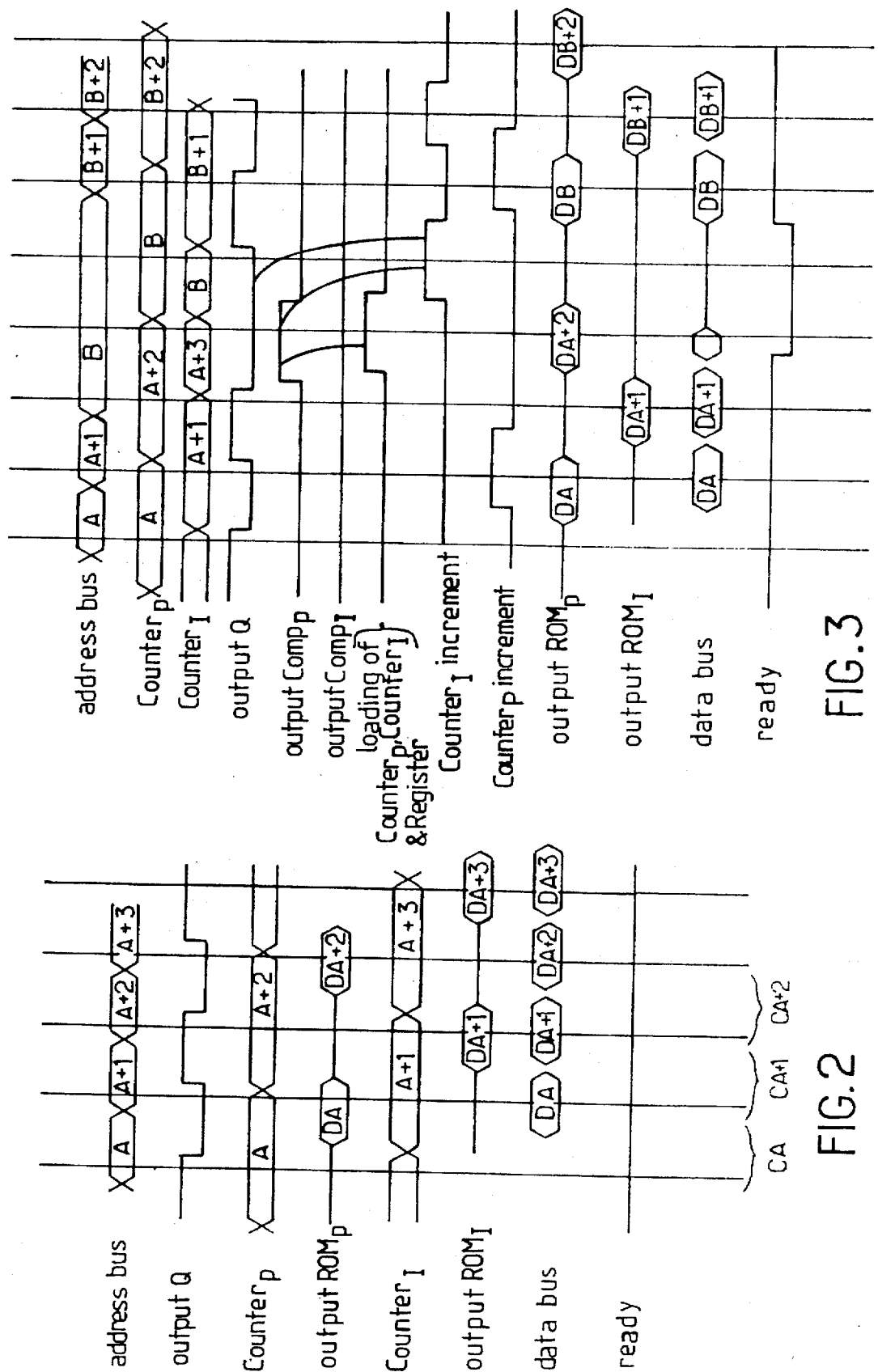
FIG. 2 is a time chart illustrating a linear sequence of code of the device represented in FIG. 1.
FIG. 3 is a time chart illustrating an operating cycle of the device represented in FIG. 1 with a break in the sequence.

As evidenced in the time chart represented in FIG. 2, in the case of a linear sequence of code, the operating cycle CA of the device previously described is as follows from the moment an address A is generated and transmitted by the address bus 1 by the processor µP (microprocessor address):

If the address A is even:

At the start of the cycle CA, the counter Counter$_P$ contains the address A it acquired during the previous cycle. It presents this address to the memory ROM$_P$. The logic circuit 4, of which the input is in the logic "0" state, increments the counter Counter$_I$ which moves on to the address A+1 (output Counter$_I$).

At the end of the cycle CA, the buffer Buffer$_P$ is open for the memory block ROM$_P$ to transmit the datum DA that was contained in the address A (output MP). The microprocessor µP samples off the datum DA. The buffer Buffer$_I$ is closed during the cycle CA.

During the next cycle (cycle CA+1):

At the start of this cycle, the counter Counter$_P$ is incremented (output Counter$_P$) and presents the address A+2 to the memory block ROM$_P$ during the cycle CA+2. Since the cycle CA, the counter Counter$_I$ has contained the address A+1 (output Counter$_I$) and holds it during the cycle CA+1. At the end of the cycle CA+1, the buffer Buffer$_I$ is open for the memory block ROM$_I$ to transmit the datum DA+1 (data bus). The microprocessor µP can then sample off the datum DA+1. The buffer Buffer$_P$ is closed during the cycle CA+1.

The difficulty encountered in applying this method resides in the sequence breaks that must be detected before the microprocessor samples off an erroneous datum due to the anticipation of the address supplied by the counters.

This is the reason why the device comprises an error detecting circuit using two logic comparators Comp$_P$, Comp$_I$ (therefore very fast) which respectively compare the outputs of the counters Counter$_P$ and Counter$_I$ with the address supplied by the processor µP.

If the output Q of the register 3 is in the logic "0" state, the output of the comparator Comp$_P$ is valid during the cycle.

If the result of the comparison performed by the comparator Comp$_P$ reveals an identity, the address anticipated by the counter Counter$_P$ is correct in relation to the one supplied on the bus 1 (microprocessor address) by the microprocessor µP. The datum contained in the memory ROM$_P$ at this address can therefore move past the buffer Buffer$_P$ and be sampled off by the microprocessor µP at the end of the cycle.

If the result of the comparison performed by the comparator Comp$_P$ reveals a difference, e.g. due to the fact that the microprocessor µP has just conducted a sequence break and that it therefore presents on the address bus 1 the address B and not the address A (FIG. 3), the address A anticipated by the counter Counter$_P$ (which was incremented during the previous cycle) is therefore incorrect in relation to the one provided by the microprocessor µP on the address bus 1. It is then necessary to block the "ready" response sent by the logic 4 to the microprocessor µP in order to prohibit the latter from sampling off a wrong datum.

In addition to this blocking, the difference detected by the comparator Comp$_P$ causes the counters Counter$_P$, Counter$_I$ of the register 3 to be loaded by the address bus 1 (the register 3 being loaded by the least significant bit of the address present on the address bus 1). This loading takes place at the end of cycle B.

Subsequent to this loading, if the output Q of the register 3 is in the logic "0" state, this means that the address B is an even address. Accordingly, the counter Counter$_I$ is incremented at the end of the next cycle. Conversely, if the output Q is in the logic "1" state, the counter Counter$_P$ is incremented at the end of the next cycle. The datum 2 contained in the memory at the address B is supplied over three cycles instead of one cycle in a linear sequence. The datum DB+1 is then supplied over one cycle subsequent to the supplying of datum DB.

If the output Q of the register 3 is in the logic "1" state, the comparator Comp$_I$ is valid during the cycle.

If the result of the comparison performed reveals an identity, the address anticipated by the counter Counter$_I$ is correct in relation to the one provided by the microprocessor µP. The datum supplied by the memory ROM$_I$ via the buffer Buffer$_I$ can be sampled off by the processor µP at the end of the cycle.

If the result of the comparison performed by the counter Comp$_I$ reveals a difference due to the fact that the processor µP has just conducted a sequence break and presents address B on the bus 1 and not address A, the address A anticipated by the counter Counter$_I$ is incorrect in relation to the one provided by the microprocessor µP. The logic circuit 4 blocks the "ready" response sent to the processor in order to prohibit the sampling off of a wrong datum. Furthermore, the counters Counter$_P$ and Counter$_I$ are loaded by the address bus 1, whereas the register 3 receives the least significant bit of the address present on the bus 1. This loading takes place at the end of cycle B.

Subsequent to this loading, if the output Q of the register 3 is in the logic "0" state, the address B is an even address and the counter Counter$_I$ is incremented at the end of the next cycle. The datum DB is then supplied over three cycles instead of one cycle in a linear sequence. The next datum DB+1 is then supplied during the cycle following the datum DB.

The device previously described enables the performance of the microprocessor to be upheld despite the use of slower memories, with a slight deterioration being observed, however, during breaks in the sequence of the processor µP such as those caused by branching instructions.

Thus, in the case of a program using 15% branching instructions, this device enables an efficiency of 77% to be achieved instead of 100% (obtained with a RAM code without latencies). With a program using 10% branching instructions, the efficiency would be 83%.

The invention is not, of course, limited to the embodiment previously described.

Thus, the number of circuits comprising a counter Counter$_P$, Counter$_I$, a memory block ROM$_P$, ROM$_I$ and a buffer Buffer$_P$, Buffer$_I$ could exceed two.

This number could e.g. be equal to four. In this case, the register 3 must be designed in order to receive a couple of lower order bits of the addresses generated on the address bus 1.

The logic circuit 4 comprises a means for decoding the two bits contained in the register 3 and for commanding the incrementing of one of the four counters Counter$_P$, Counter$_I$ and the opening of one of the four buffers Buffer$_P$, Buffer$_I$ as a function of the value of said couple of bits.

Four comparators Comp$_P$, Comp$_I$ will further be provided for comparing the outputs of the four counters Counter$_P$, Counter, with the address provided by the processor μP and for validating the address anticipated by the counter CP, CI or for prohibiting the sampling off of a wrong datum by the processor, according to a process similar to the one previously described.

what is claimed:

1. A device for speeding up the reading of a memory by a processor connected to an address bus and a data bus, said processor providing on said address bus, addresses of data in said memory to be sampled off by said processor from said data bus, said device comprising:

at least two circuits each comprising: (i) a memory having addressing inputs and read outputs, (ii) a counter connected to said address bus and to said addressing inputs of said memory, and, (iii) a buffer connected to said data bus and to said read outputs of said memory for receiving a data located in said memory at an address which is applied to said addressing inputs, and (iv) a means for comparing the address supplied by said counter with the address provided by the processor on said address bus, said counter receiving bits of the addresses transmitted by said address bus except at least one lower order bit of said addresses which is stored in a register, said data being stored at same addresses in each of the respective memories of said at least two circuits, and a logic circuit for controlling a succession of data transfer cycles at a transmission rate of said transmitted addresses, said logic circuit comprising: (i) means for exclusively allowing to transfer at each of said cycles on said data bus as a function of said at least one lower order bit stored in said register data contained in the buffer of one of said at least two circuits only if said comparing means thereof reveals an identity, and for allowing to load said transmitted address in said counters and said register only if said comparing means reveals a discrepancy, and (ii) means for incrementing at each of said cycles the counters of others of said at least two circuits in order to anticipate data transfers of next cycles.

2. The device as claimed in claim 1, comprising two of said at least two circuits, the register being loaded by the lower order address bit so as to control the incrementing of one or the other of said counters and the authorizing of one or the other of said buffers, depending on whether the address is even or odd.

3. The device as claimed in claim 1, wherein said comparing means of each of said at least two circuits comprises a logic comparator for comparing the addresses supplied as outputs of said counters with the address provided by the processor, said logic circuit authorizing, at the end of each cycle, the transfer of the data contained in the buffer which is supposed to contain the data corresponding to said address only if the comparison performed by the corresponding comparator reveals an identity, and to prohibit said transfer in the event of said comparison revealing a discrepancy.

4. The device as claimed in claim 3, wherein said logic circuit further comprises a means for enabling said counters and said register to be loaded by said address bus only if one of comparators reveals a discrepancy.

5. The device as claimed in claim 1, comprising four circuits each comprising a counter, a memory block and a buffer, the register being designed to receive a couple of lower order bits of the addresses generated on the address bus, said logic circuit then comprising a decoding means for controlling incrementing of one of said four counters and opening of one of said four buffers as a function of the value of said couple of bits.

6. The device as claimed in claim 5, further comprising four comparators for comparing the outputs of said four counters with the address provided by the processor and for validating the address anticipated by one of said counters or for prohibiting the sampling off of a wrong datum by the processor.

* * * * *